Sept. 27, 1932.  R. J. O'BRIEN  1,879,437
TRUCK CENTER BOLSTER CUSHION
Filed July 25, 1929
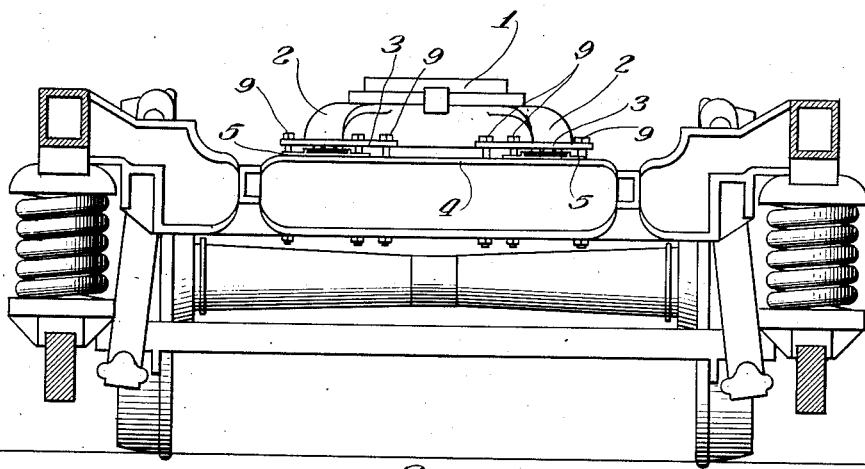
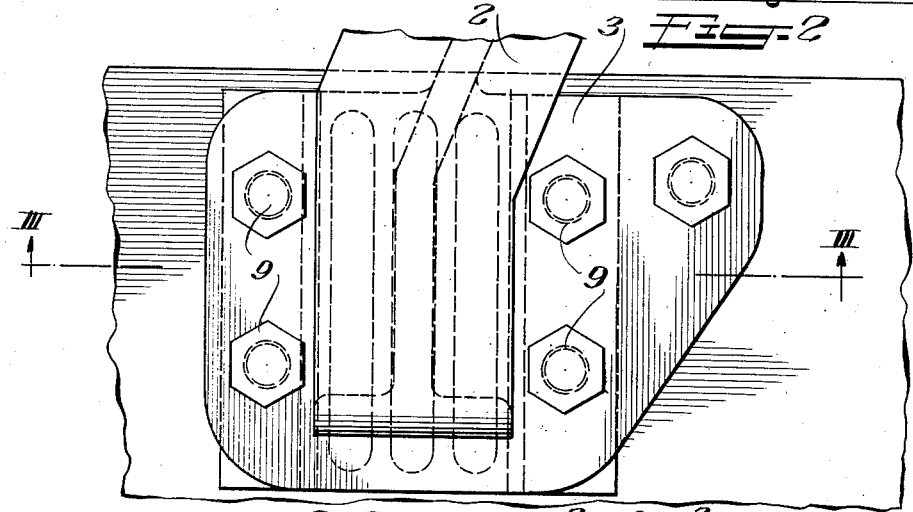
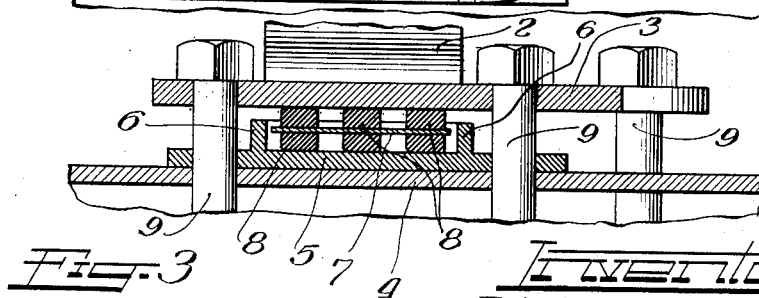
Inventor:
Richard J. O'Brien.

Patented Sept. 27, 1932

1,879,437

UNITED STATES PATENT OFFICE

RICHARD J. O'BRIEN, OF DEPEW, NEW YORK, ASSIGNOR TO WAUGH EQUIPMENT COMPANY, OF DEPEW, NEW YORK, A CORPORATION OF MAINE

TRUCK CENTER BOLSTER CUSHION

Application filed July 25, 1929. Serial No. 380,826.

This invention relates to a center bolster cushion for vehicles such as railroad cars and it is an object of this invention to provide a cushion under the ends of the bolster with provision for the bolster to move with the movements of the cushion and wherein the expansion of the cushion is more or less limited so that a good yield and cushioning effect is always present.

In cars used for transporting passengers, noises, vibrations and shocks resulting from contact of the wheel treads and flanges with the running rails are transmitted from the rails up through the wheels, axles, bearings, equalizers and other parts of the truck to the car under frame and body. By effectively breaking the metallic contact at the various points, such noises, shocks and the like are prevented from reaching the car body and causing annoyance and discomfort to the occupants, especially during night travel in sleeping cars.

The invention comprises the novel structure and combination of parts hereinafter described and more particularly pointed out and defined in the appended claims.

In the accompanying drawing which illustrates a preferred form of this invention and in which similar reference numerals refer to similar features in the different views:

Figure 1 is an end elevational view of a railroad truck showing two end members of the center bolster.

Figure 2 is an enlarged fragmentary top plan view of the center bolster illustrating the cushioning means under the two end members of the center bolster.

Figure 3 is a sectional view taken upon the line III—III of Figure 2.

In referring to the drawing it will be noted that only certain parts of the car truck have been illustrated in order to show the center bolster 1 and two of its arms or end members 2, each of which is integral with or attached to a plate 3. Upon the truck bolster 4, there is placed a cushion seat or retainer 5 having spaced upstanding flanges 6 between which the cushion is confined.

In the illustrated embodiment, the cushion consists of a center plate 7 having a plurality of rubber strips 8 or the like secured upon each side as shown in Figure 3. These strips are spaced apart a sufficient distance so that the gaps therebetween will be closed when pressure is applied to the cushion and the strips are sufficiently expanded. Further, during such expanding action of the strips, the spaces between the flanges 6 and the outermost strips 8 will be closed. These gaps will be closed before the strips 8 can be fully expanded with the result that a good yield and cushioning effect will always be maintained due to this limitation of expansion.

The plates 3, cushion seat 5 and truck bolster 4 are suitably apertured for receiving the bolts 9 which anchor the end members of the center bolster to the truck bolster. It will be noted that the upper parts of these bolts are smooth so that the plate 3 may slide thereon during the movements of the cushion elements.

In the illustrated embodiment of this invention, only the two arms or members at one end of the bolster are shown, it will however be understood that the arms or end members upon the opposite end of the center bolster are intended to be similarly cushioned. The cented bolster will accordingly be cushioned at four different points and it is so secured that it can move in response to the yield in the cushions, and on account of the fact that the cushion is limited in its expansion a good yield and cushioning effect will always be provided.

I am aware that numerous details of construction may be varied through a wide range without departing from the principles of this invention, and I therefore do not purpose limiting the patent granted, otherwise than necessitated by the prior art.

I claim as my invention:

1. In a vehicle having a center bolster, means for supporting the ends thereof for relative vertical movement on the truck bolster and cushion elements under said movable ends.

2. In a vehicle having a center bolster, and a truck bolster, a cushion retainer upon said truck bolster, expansible cushion elements in said retainer, and means for movably securing said center bolster ends to the truck bolster and in contact with said cushion.

3. In a vehicle having a center bolster and a truck bolster, a retainer having upwardly extending flanges upon opposite sides, expansible rubber cushion elements in said retainer between said flanges and limited in expansion thereby, and bolts extending through said center bolster, retainer and truck bolster and movably confining said center bolster.

4. In a vehicle having a center bolster and a truck bolster, means for connecting said center bolster to said truck bolster for relative vertical movement, and cushion elements between said bolsters.

5. In a vehicle having a center bolster and a truck bolster, means for securing said center bolster to said truck bolster for relative vertical movement, expansible cushion elements between said bolsters and means for limiting the expansion thereof.

In testimony whereof, I have hereunto subscribed my name at Chicago, Cook County, Illinois.

RICHARD J. O'BRIEN.